US008768692B2

(12) United States Patent
Hayakawa

(10) Patent No.: US 8,768,692 B2
(45) Date of Patent: Jul. 1, 2014

(54) SPEECH RECOGNITION METHOD, SPEECH RECOGNITION APPARATUS AND COMPUTER PROGRAM

(75) Inventor: Shoji Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1091 days.

(21) Appl. No.: 11/797,409

(22) Filed: May 3, 2007

(65) Prior Publication Data

US 2008/0077403 A1 Mar. 27, 2008

(30) Foreign Application Priority Data

Sep. 22, 2006 (JP) .................................. 2006-257788

(51) Int. Cl.
G10L 21/00 (2013.01)
G10L 21/02 (2013.01)
G10L 15/00 (2013.01)
G10L 15/20 (2006.01)

(52) U.S. Cl.
USPC ............................ 704/226; 704/236; 704/233

(58) Field of Classification Search
CPC ........................ G10L 21/0216; G10L 21/0264
See application file for complete search history.

(56) References Cited

U.S. PATENT DOCUMENTS

| 4,821,325 | A | | 4/1989 | Martin et al. ................... 381/46 |
| 5,757,937 | A | | 5/1998 | Itoh et al. ..................... 381/94.3 |
| 5,930,749 | A | * | 7/1999 | Maes .......................... 704/228 |
| 6,001,131 | A | * | 12/1999 | Raman .......................... 704/226 |
| 6,845,357 | B2 | * | 1/2005 | Shetty et al. .................. 704/255 |
| 6,859,488 | B2 | * | 2/2005 | Azenkot et al. ............... 375/147 |
| 6,990,447 | B2 | * | 1/2006 | Attias et al. ................... 704/240 |
| 7,165,026 | B2 | * | 1/2007 | Acero et al. .................. 704/226 |
| 7,321,559 | B2 | * | 1/2008 | Etter et al. .................... 370/242 |
| 2002/0184012 | A1 | * | 12/2002 | Burnett et al. ................. 704/223 |
| 2003/0088412 | A1 | * | 5/2003 | Shetty et al. .................. 704/243 |
| 2003/0093269 | A1 | * | 5/2003 | Attias et al. ................... 704/226 |
| 2004/0001599 | A1 | * | 1/2004 | Etter et al. .................... 381/94.1 |
| 2004/0083100 | A1 | * | 4/2004 | Burnett et al. ................. 704/233 |
| 2004/0190732 | A1 | * | 9/2004 | Acero et al. .................. 381/94.1 |
| 2005/0163196 | A1 | * | 7/2005 | Currivan et al. .............. 375/144 |

(Continued)

FOREIGN PATENT DOCUMENTS

EP 1 465 160 A2 6/2004
JP 6-110491 4/1994

(Continued)

OTHER PUBLICATIONS

Noise power spectral density estimation based on optimal smoothing and minimum statistics, IEE Trans. on speech and audio processing. vol. 9, No. 5, pp. 504-512, published on Jul. 31, 2001.

(Continued)

Primary Examiner — Douglas Godbold
Assistant Examiner — Michael Ortiz Sanchez
(74) Attorney, Agent, or Firm — Kratz, Quintos & Hanson, LLP

(57) ABSTRACT

A speech recognition apparatus predicts, based on the occurrence cycle and duration time of impulse noise that occurs periodically, a segment in which impulse noise occurs, and executes speech recognition processing based on the feature components of the remaining frames excluding a feature component of a frame corresponding to the predicted segment, or the feature components extracted from frames created from sound data excluding a part corresponding to the predicted segment.

28 Claims, 7 Drawing Sheets

(56) References Cited

U.S. PATENT DOCUMENTS

| | | | |
|---|---|---|---|
| 2005/0203735 A1* | 9/2005 | Ichikawa | 704/226 |
| 2005/0278167 A1* | 12/2005 | Burnett et al. | 704/207 |
| 2006/0078044 A1* | 4/2006 | Norrell et al. | 375/222 |
| 2008/0019538 A1* | 1/2008 | Kushner et al. | 381/94.1 |

FOREIGN PATENT DOCUMENTS

| | | |
|---|---|---|
| JP | 7-334189 | 12/1995 |
| JP | 2002-116794 | 4/2002 |
| JP | 2003-58186 | 2/2003 |
| JP | 2003-308092 | 10/2003 |

OTHER PUBLICATIONS

Smoothed spectral subtraction for a frequency-weighted HMM in noisy speech recognition, ICSLP 96. vol. 2, pp. 905-908, published on Oct. 31, 1996.

Office Action dated Mar. 16, 2009 issued in the Korean patent application No. 10-2008-120753 and Certification statement.

Bauer, G.: She'Hilfe. Aus: Professional Audio Magazine, Jul. 2006, S.98'101.; Laid open date Jul. 2006.

Office Action dated Oct. 13, 2009 in corresponding German patent application No. 10 2007 020 047.3-56 with English Translation.

Office Action dated Apr. 12, 2011 issued in Japanese Patent Application No. 2006-257788 with English translation and Certification of translation.

* cited by examiner

SPEECH RECOGNITION METHOD, SPEECH RECOGNITION APPARATUS AND COMPUTER PROGRAM

CROSS-REFERENCE TO RELATED APPLICATION

This non-provisional application claims priority under 35 U.S.C. §119(a) on Patent Application No. 2006-257788 fled in Japan on Sep. 22, 2006, the entire contents of which are hereby incorporated by reference.

BACKGROUND OF THE INVENTION

1. Field of the Invention

The present invention relates to a speech recognition method which creates frames whose length is predetermined, from sound data obtained by sampling sound, and executes speech recognition processing based on feature components extracted from the respective frames; a speech recognition apparatus adopting the speech recognition method; and a computer program for realizing the speech recognition apparatus, and more particularly relates to a speech recognition method, a speech recognition apparatus and a computer program for removing impulse noise, such as the relay sound of a hazard flasher provided in a vehicle.

2. Description of Related Art

On-vehicle devices, such as a car navigation device, often have a speech recognition function. An on-vehicle device with a speech recognition function has high speech recognition accuracy under an environment where there is stationary noise such as road noise and the engine sound, but does not have sufficient robustness in terms of the recognition accuracy under an environment where there is non-stationary noise that occurs suddenly. In particular, when non-stationary noise occurs during a speech, the recognition rate in this segment is decreased.

As a method for removing non-stationary noise, Japanese Patent Application Laid-Open No. 2003-308092 discloses a method which learns the cycle of non-stationary noise that occurs at a certain cycle in a noise segment, and subtracts a noise power spectrum related to the non-stationary noise from a noise-superimposed voice power spectrum when non-stationary noise is superimposed on a voice segment.

BRIEF SUMMARY OF THE INVENTION

However, in the conventional method disclosed in Japanese Patent Application Laid-Open No. 2003-308092, when impulse noise which continues in a short time and changes rapidly with time, such as the relay sound of a hazard flasher, is superimposed on a voice segment as non-stationary noise, it is difficult to accurately subtract impulse noise that changes rapidly with time in a power spectrum area where time resolution is low, and thus there is a problem that the speech recognition accuracy may be decreased.

The present invention has been made with the aim of solving the above problems, and it is an object of the present invention to provide a speech recognition method capable of highly accurately executing speech recognition processing even under an environment where impulse noise that continues for a short time and changes rapidly with time occurs by performing the speech recognition processing after removing sound data predicted as having impulse noise superimposed or frames created from the sound data; a speech recognition apparatus adopting the speech recognition method; and a computer program for realizing the speech recognition apparatus.

A speech recognition method according to a first aspect is a speech recognition method which creates plural frames whose length is predetermined, from sound data obtained by sampling sound and executes speech recognition processing based on feature components extracted from the respective frames, and characterized by recording an occurrence cycle and a duration time of impulse noise that occurs periodically; predicting, based on the recorded occurrence cycle and duration time, the segment in which impulse noise occurs; and executing speech recognition processing based on feature components of remaining frames excluding a feature component of a frame corresponding to the predicted segment.

In this invention, since speech recognition processing is executed based on the feature components of the remaining frames excluding the feature component extracted from the frame corresponding to the segment predicted based on the occurrence cycle and duration time of impulse noise, the speech recognition processing is not performed using a feature component affected by impulse noise superimposed on a frame. Thus, it is possible to prevent recognition errors due to impulse noise, and it is possible to execute speech recognition processing highly accurately even under an environment where impulse noise occurs.

A speech recognition method according to a second aspect is a speech recognition method which creates plural frames whose length is predetermined, from sound data obtained by sampling sound and executes speech recognition processing based on feature components extracted from the respective frames, and characterized by recording an occurrence cycle and a duration time of impulse noise that occurs periodically; predicting, based on the recorded occurrence cycle and duration time, the segment in which impulse noise occurs; creating frames whose length is predetermined, from the sound data excluding a part corresponding to the predicted segment; and executing speech recognition processing based on the feature components extracted from the respective frames.

In this invention, since speech recognition processing is executed based on the feature components extracted from frames created from the sound data excluding the part corresponding to the segment predicted based on the occurrence cycle and duration time of impulse noise, the speech recognition processing is not performed using a feature component affected by impulse noise superimposed on the sound data. Thus, it is possible to prevent recognition errors due to impulse noise, and it is possible to execute speech recognition processing highly accurately even under an environment where impulse noise occurs.

A speech recognition apparatus according to a third aspect is a speech recognition apparatus which comprises a buffer for storing feature components extracted from frames whose length is predetermined, created from sound data obtained by sampling sound and executes speech recognition processing based on the feature components of the respective frames stored in the buffer, and characterized by comprising: recording means for recording an occurrence cycle and a duration time of impulse noise that occurs periodically; predicting means for predicting, based on the occurrence cycle and duration time recorded in the recording means, the segment in which impulse noise occurs; and means for deleting a feature component of a frame corresponding to the predicted segment from the buffer.

In this invention, since speech recognition processing is executed based on the feature components of the frames excluding the feature component of the frame corresponding to the segment predicted based on the occurrence cycle and duration time of impulse noise, the speech recognition processing is not performed using a feature component affected by impulse noise superimposed on a frame. Thus, it is possible to prevent recognition errors due to impulse noise, and it is possible to execute speech recognition processing highly accurately even under an environment where impulse noise occurs.

A speech recognition apparatus according to a fourth aspect is a speech recognition apparatus which comprises a buffer for storing frames whose length is predetermined, created from sound data obtained by sampling sound and executes speech recognition processing based on feature components extracted from the respective frames stored in the buffer, and characterized by comprising: recording means for recording an occurrence cycle and a duration time of impulse noise that occurs periodically; predicting means for predicting, based on the occurrence cycle and duration time recorded in the recording means, the segment in which impulse noise occurs; means for deleting a part corresponding to the predicted segment from the sound data; means for creating frames whose length is predetermined, from the sound data from which the part corresponding to the predicted segment was deleted; and means for storing the created frames in the buffer.

In this invention, since speech recognition processing is executed based on the feature components extracted from frames created from the sound data from which the part corresponding to the segment predicted based on the occurrence cycle and duration time of impulse noise was deleted, the speech recognition processing is not performed using a feature component affected by impulse noise superimposed on the sound data. Thus, it is possible to prevent recognition errors due to impulse noise, and it is possible to execute speech recognition processing highly accurately even under an environment where impulse noise occurs.

A speech recognition apparatus according to a fifth aspect is based on the third aspect or fourth aspect, and characterized by comprising: voice segment distinguishing means for distinguishing between a voice segment containing voice and a voiceless segment containing no voice in the sound data; noise determining means for determining, based on an intensity of the sound data corresponding to a segment distinguished as a voiceless segment by the voice segment distinguishing means, whether or not impulse noise occurs; and noise calculating means for calculating, if a determination is made that impulse noise occurs, an occurrence cycle and a duration time of the impulse noise which occurs, based on the intensity of the sound data in a voiceless segment, wherein the recording means is constructed to record the calculated occurrence cycle and duration time.

In this invention, since whether or not impulse noise occurs and the occurrence cycle and duration time of impulse noise are calculated based on the sound data in a voiceless segment, it is possible to accurately estimate the occurrence cycle and duration time of impulse noise.

A speech recognition apparatus according to a sixth aspect is based on the fifth aspect, and characterized in that the predicting means is constructed to predict the segment in which impulse noise occurs, within a segment distinguished as a voice segment by the voice segment distinguishing means.

In this invention, since the feature component or sound data of the frame in which impulse noise occurs in a voice segment is deleted, it is possible to highly accurately execute speech recognition processing even when impulse noise is superimposed on voice.

A speech recognition apparatus according to a seventh aspect is based on the fifth or sixth aspect, and characterized in that the noise determining means is constructed to determine whether or not impulse noise occurs based on a maximum value of the intensity of the sound data, and a period from the time at which the intensity exceeded a preset threshold value to the time at which the intensity became lower than the threshold value.

In this invention, since false detection of impulse noise is prevented, it is possible to prevent a decrease in the recognition rate due to the deletion of the feature component or sound data of "innocent" frame on which impulse noise is not superimposed.

A speech recognition apparatus according to an eighth aspect is based on the third aspect or fourth aspect, and characterized by further comprising means for receiving an operation signal indicating that an operation related to the generation of impulse noise is in progress from an external device related to the generation of impulse noise, wherein the predicting means is constructed to predict, based on the operation signal, the segment in which impulse noise occurs.

In this invention, when an operation signal is received from an electric control unit (ECU) for controlling mechanisms, such as a hazard flasher and direction indicator, which are mounted in a vehicle and generate impulse noise such as the relay sound, the process of removing impulse noise is performed, and therefore it is possible to accurately detect the occurrence of impulse noise and it is possible to highly accurately execute speech recognition processing.

A computer program according to a ninth aspect is a computer program for causing a computer, which comprises a buffer storing feature components extracted from frames whose length is predetermined, created from sound data obtained by sampling sound, to execute speech recognition processing based on the feature components of the respective frames stored in the buffer, and characterized by comprising: a step of causing the computer to record an occurrence cycle and a duration time of impulse noise that occurs periodically; a step of causing the computer to predict, based on the occurrence cycle and duration time, the segment in which impulse noise occurs; and a step of causing the computer to delete a feature component of a frame corresponding to the predicted segment from the buffer.

In this invention, by executing the computer program with a computer such as a navigation device, the computer operates as a speech recognition apparatus and executes speech recognition processing based on the feature components of frames excluding the feature component of frame corresponding to the segment predicted based on the occurrence cycle and duration time of impulse noise. Thus, since the speech recognition processing is not performed using a feature component affected by impulse noise superimposed on a frame, it is possible to prevent recognition errors due to impulse noise, and it is possible to execute speech recognition processing highly accurately even under an environment where impulse noise occurs.

A computer program according to a tenth aspect is a computer program for causing a computer, which comprises a buffer storing frames whose length is predetermined, created from sound data obtained by sampling sound, to execute speech recognition processing based on feature components extracted from the respective frames stored in the buffer, and characterized by comprising: a step of causing the computer to record an occurrence cycle and a duration time of impulse noise that occurs periodically; a step of causing the computer to predict, based on the occurrence cycle and duration time, the segment in which impulse noise occurs; a step of causing the computer to delete a part corresponding to the predicted segment from the sound data; and a step of causing the computer to create frames whose length is predetermined, from the sound data from which the part corresponding to the predicted segment was deleted.

In this invention, by executing the computer program with a computer such as a navigation device, the computer operates as a speech recognition apparatus and executes speech recognition processing based on feature components extracted from frames created from the sound data excluding the part corresponding to the segment predicted based on the occurrence cycle and duration time of impulse noise. Thus, since the speech recognition processing is not performed using a feature component affected by impulse noise superimposed on the sound data, it is possible to prevent recognition errors due to impulse noise, and it is possible to execute speech recognition processing highly accurately even under an environment where impulse noise occurs.

A speech recognition method, a speech recognition apparatus and a computer program according to the present invention predict, based on the occurrence cycle and duration time of impulse noise which occurs periodically, the segment in which impulse noise occurs, and execute speech recognition processing based on the feature components of remaining frames excluding the feature component of a frame corresponding to the predicted segment.

In this structure, since the present invention does not perform speech recognition processing using feature components affected by "dirty" frames which impulse noise is superimposed on, it is possible to control a decrease in the speech recognition accuracy caused by a decrease in the similarity, that is, the result of matching process with respect to the acoustic models performed as speech recognition processing. In addition, it is possible to reduce recognition errors caused by the "insertion error" of phoneme, syllable and word due to impulse noise. It is thus possible to produce beneficial effects, such as making it possible to execute speech recognition processing highly accurately even under an environment where impulse noise occurs.

A speech recognition method, a speech recognition apparatus and a computer program according to the present invention predict, based on the occurrence cycle and duration time of impulse noise which occurs periodically, the segment in which impulse noise occurs, and execute speech recognition processing based on the frames created from the sound data excluding the part corresponding to the predicted segment.

In this structure, since the present invention does not perform speech recognition processing using a feature component affected by a "dirty" frame which impulse noise is superimposed on, it is possible to control a decrease in the speech recognition accuracy caused by a decrease in the similarity in the speech recognition processing. In addition, it is possible to reduce recognition errors caused by the "insertion error" of phoneme, syllable and word due to impulse noise. It is thus possible to produce beneficial effects, such as making it possible to execute speech recognition processing highly accurately even under an environment where impulse noise occurs.

A speech recognition apparatus and so on according to the present invention distinguish between a voice segment containing voice and a voiceless segment containing no voice in the sound data, determine, based on the intensity of the sound data corresponding to a segment distinguished as a voiceless segment, whether or not impulse noise occurs; and, if a determination is made that impulse noise occurs, calculate the occurrence cycle and duration time of the impulse noise which occurs, based on the intensity of the sound data in a voiceless segment. It is thus possible to produce beneficial effects, such as making it possible to accurately estimate the occurrence cycle and duration time of impulse noise.

Moreover, since the speech recognition apparatus and so on of the present invention predict the segment in which impulse noise occurs, within the segment distinguished as the voice segment, and delete the feature component or sound data of the frame in which impulse noise occurs within the voice segment, it is possible to produce beneficial effects, such as making it possible to execute speech recognition processing highly accurately even when impulse noise is superimposed on voice.

Further, since the speech recognition apparatus and so on of the present invention prevent false detection of impulse noise by determining whether or not impulse noise occurs based on the maximum value of the intensity of the sound data and the period from the time at which the intensity exceeded a preset threshold value to the time at which the intensity became lower than the threshold value, it is possible to produce beneficial effects, such as making it possible to prevent a decrease in the recognition rate due to the deletion of the feature component or sound data of the "innocent" frame on which impulse noise is not superimposed.

Additionally, the speech recognition apparatus and so on of the present invention are used as a navigation system to be installed in a vehicle, for example, and can accurately detect the occurrence of impulse noise by predicting the occurrence of impulse noise and performing the process of removing impulse noise upon receipt of an operation signal indicating that an operation is in progress from an electric control unit (ECU) for controlling mechanisms, such as a hazard flasher and direction indicator, which are installed in the vehicle and generate impulse noise such as the relay sound. It is thus possible to produce beneficial effects, such as making it possible to highly accurately execute speech recognition processing.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Figure 1:
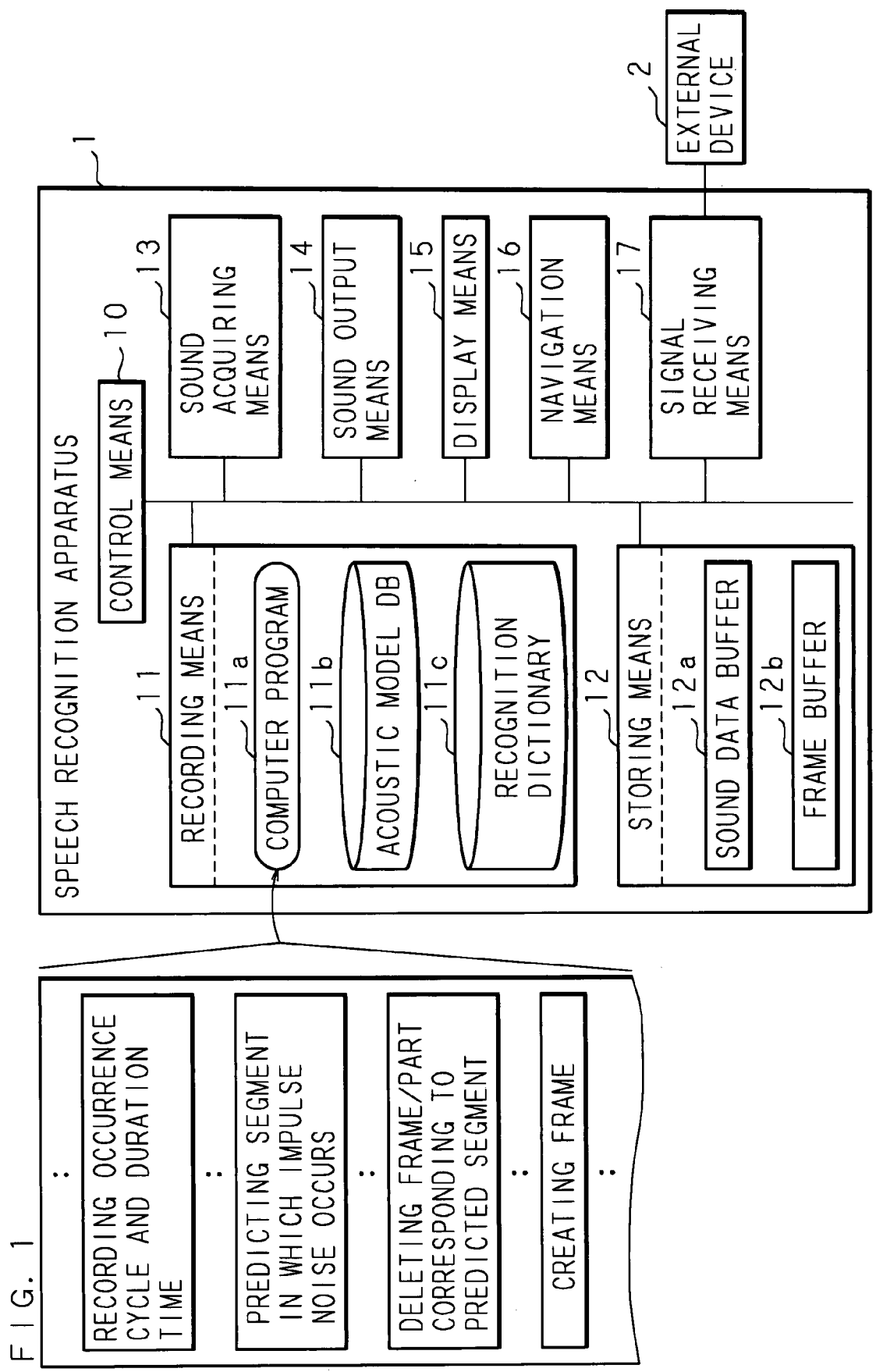
FIG. 1 is a block diagram showing a structural example of a speech recognition apparatus according to Embodiment 1 of the present invention.

FIG. 1 is a block diagram showing a structural example of a speech recognition apparatus according to Embodiment 1 of the present invention. In FIG. 1, 1 represents a speech recognition apparatus using a computer, such as a navigation system installed on a vehicle. The speech recognition apparatus 1 comprises control means 10 (controller) such as a CPU (Central Processing Unit) and a DSP (Digital Signal Processor) for controlling the entire apparatus; recording means 11 (recording section) such as a hard disk and a ROM for recording various kinds of information including programs and data; storing means 12 such as a RAM for storing temporarily generated data; sound acquiring means 13 such as a microphone for acquiring sound from outside; sound output means 14 such as a speaker for outputting sound; display means 15 such as a liquid crystal monitor; navigation means 16 for executing processing related to navigation, such as indicating a route to a destination; and signal receiving means 17 (receiving section) for receiving various kinds of signals from an external device 2 such as an electric control unit (ECU) installed on a vehicle.

A computer program 11a of the present invention is recorded in the recording means 11, and a computer operates as the speech recognition apparatus 1 of the present invention by storing various kinds of processing steps contained in the recorded computer program 11a into the storing means 12 and executing them under the control of the control means 10.

A part of the recording area of the recording means 11 is used as various kinds of databases, such as an acoustic model database (acoustic model DB) 11b recording acoustic models for speech recognition, and a recognition dictionary 11c recording recognizable vocabulary described by phonemic or syllabic definitions corresponding to the acoustic models, and grammar.

A part of the storing means 12 is used as a sound data buffer 12a for storing digitized sound data obtained by sampling sound, which is an analog signal acquired by the sound acquiring means 13, at a predetermined cycle, and a frame buffer 12b for storing feature components extracted from frames created by dividing the sound data by a predetermined time length.

The navigation means 16 includes a position detecting mechanism such as a GPS (Global Positioning System), and a storage medium such as a DVD (Digital Versatile Disk) and a hard disk storing map information. The navigation means 16 executes navigation processing, such as searching for a route from the current location to a destination and indicating the route; shows the map and route on the display means 15; and outputs a voice guide from the sound output means 14.

The signal receiving means 17 receives various kinds of signals, such as an operation signal indicating that an operation is in progress, from the external device 2 which is installed on a vehicle and controls mechanisms such as a hazard flasher and direction indicator that generate impulse noise, such as the relay sound.

The structural example shown in FIG. 1 is merely one example, and it is possible to develop the present invention in various forms. For example, it may be possible to construct a function related to speech recognition as a single or a plurality of VLSI chips, and incorporates it into a navigation device, or it may be possible to externally mount a device for use exclusively for speech recognition on the navigation device. It may also be possible to use the control means 10 for both of speech recognition and navigation, or it may be possible to provide a circuit to be used exclusively for each processing. Further, it may be possible to incorporate into the control means 10 a co-processor for executing processing such as specific calculation related to speech recognition, for example, later-described FFT (Fast Fourier Transformation) and DCT (Discrete Cosine Transformation). Alternatively, it may be possible to construct the sound data buffer 12a as an accessory circuit of the sound acquiring means 13, and construct the frame buffer 12b on the memory of the control means 10. Further, the speech recognition apparatus 1 of the present invention is not limited to an on-vehicle device such as a navigation device, and may be used in devices for various applications which perform speech recognition.

Figure 2:
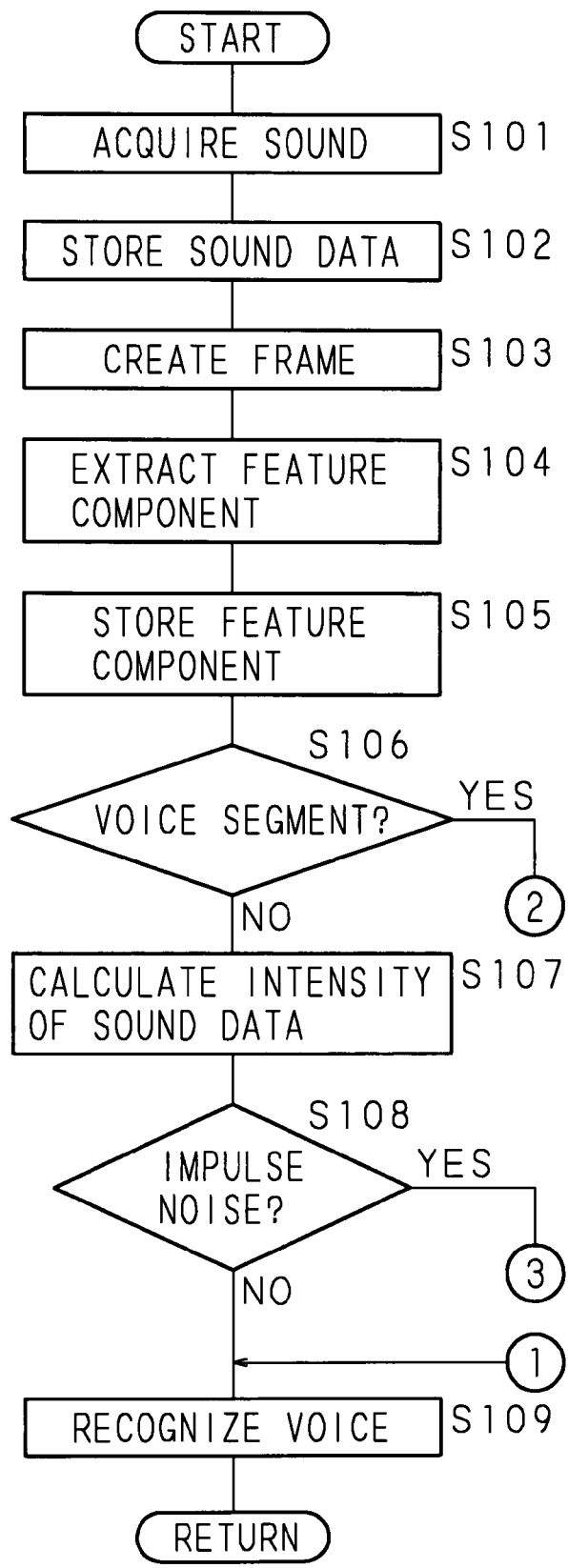
FIG. 2 is a flowchart showing one example of processing performed by the speech recognition apparatus according to Embodiment 1 of the present invention.
Figure 3:
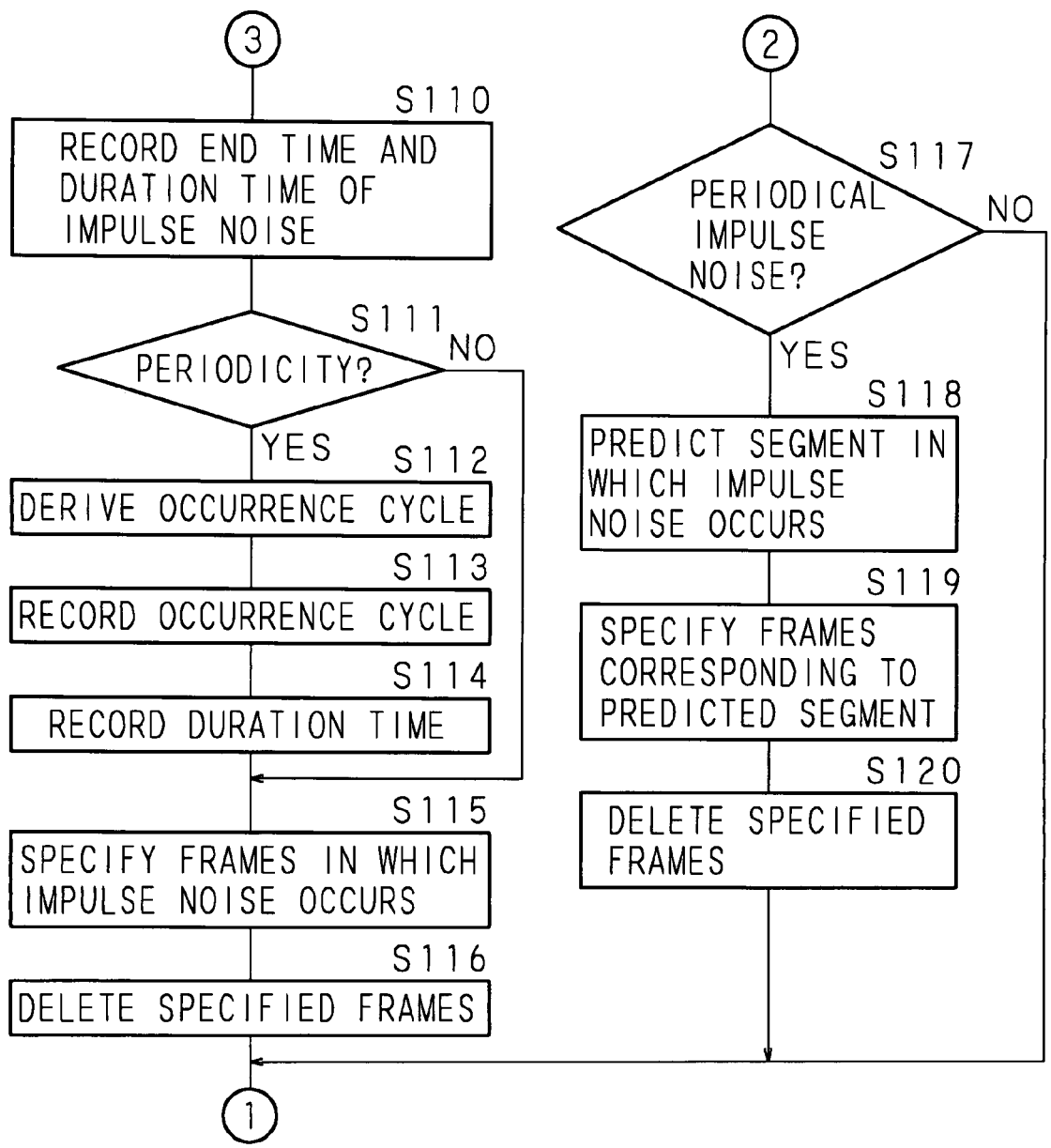
FIG. 3 is a flowchart showing one example of processing performed by the speech recognition apparatus according to Embodiment 1 of the present invention.

The following description will explain the processing performed by the speech recognition apparatus 1 according to Embodiment 1 of the present invention. FIGS. 2 and 3 are a flowchart showing one example of processing performed by the speech recognition apparatus 1 according to Embodiment 1 of the present invention. Under the control of the control means 10 that executes the computer program 11a, the speech recognition apparatus 1 acquires outside sound by the sound acquiring means 13 (S101), and digitizes the acquired sound that is an analog signal at a predetermined cycle (sampling rate) and stores the resulting digitized sound data in the sound data buffer 12a (S102). The outside sound to be acquired in S101 includes sound composed of various superimposed sounds such as the human voice, stationary noise and non-stationary noise. The human voice is the voice to be recognized by the speech recognition apparatus 1. The stationary noise is noise such as noise including road noise and the engine sound, and it may be possible to use already proposed or established various suppression methods. An example of non-stationary noise is impulse noise, such as the relay sound of mechanisms including a hazard flasher and direction indicator installed on a vehicle.

Under the control of the control means 10, the speech recognition apparatus 1 creates frames whose length is predetermined, from the sound data stored in the sound data buffer 12a (S103). In step S103, the sound data is divided into frames by a predetermined length of 20 ms to 30 ms, for example. The respective frames overlap each other by 10 ms to 15 ms. For each of the frames, the speech recognition apparatus 1 performs frame processing general to the field of speech recognition, including windowing using a Hamming window, a Hanning window etc., and filtering with a high pass filter. The following processing is performed on each of the frames thus created.

Under the control of the control means 10, the speech recognition apparatus 1 extracts a feature component from the digital signal that is the created frame (S104). A feature component to be extracted in step S104 is a feature vector capable of calculating the similarity with respect to the acoustic models recorded in the acoustic model database 11b, for example, and derived by converting the frame-processed digital signal. As the kinds of feature vectors to be used as the feature components, it may be possible to use feature vectors such as an MFCC (Mel Frequency Cepstral Coefficient) and an LPC (Linear Predictive Coding) cepstrum which are commonly used in the field of speech recognition. In the case of the MFCC, for example, the frame-processed digital signal is converted into an FFT to find an amplitude spectrum, and processed in a MEL filter bank whose center frequency is a fixed interval in a MEL frequency domain. The logarithm of the processing result is converted into a DCT, and coefficients in a lower dimension such as ranging from the first-order to 10th-order are used as feature vectors called the MFCC. Note that the order is determined based on factors such as the sampling frequency and application, and the order is not limited to 10th-order. After extracting a feature vector as a feature component, various kinds of processing with respect to the sound data related to the frame can be performed on the feature vector, and thus it is possible to realize a reduction in the required storage volume and high speed processing as compared with the case where various kinds of processing are performed on sound data of large data volume.

Then, under the control of the control means 10, the speech recognition apparatus 1 stores the feature components such as the feature vectors extracted from a plurality of frames in the frame buffer 12b (S105). The time length of frames related to the feature components to be stored in the frame buffer 12b may be equal to or longer than a supposed duration of impulse noise. For example, when the non-overlapped time of the frames is 15 ms, that is, when shifting the frames at a cycle of 15 ms, the feature components of frames corresponding to the time length of not less than 75 ms corresponding to five frames may be stored. Note that when impulse noise is shorter, it is possible to further shorten the time length to be stored. The form of information to be stored in the frame buffer 12b is not limited to the feature component. The information may be stored in the form of sound data, and the feature component may be extracted later.

Under the control of the control means 10, the speech recognition apparatus 1 determines whether the sound data related to a frame is a voice segment containing voice or a voiceless segment containing no voice (S106). For the determination in step S106, frame power indicating an integral value of the power spectrum is calculated, and, if a frame in which the calculated frame power is not less than a predetermined value continues for frames of a predetermined number and over, the sound data is distinguished as a voice segment from the first frame in which the frame power is not less than a predetermined value. The sound data is processed as a voiceless segment until a determination is made that the corresponding sound data is a voice segment. Note that a method other than the calculation method using the frame power may be used if it is capable of determining whether or not the sound data is a voice segment or a voiceless segment.

When the sound data is distinguished as a voiceless segment in step S106 (S106: NO), the speech recognition apparatus 1 calculates the intensity of sound data to be used for detecting impulse noise (S107), and determines, based on the calculated intensity of the sound data, whether or not impulse noise occurs (S108), under the control of the control means 10.

The intensity of the sound data to be calculated in step S107 indicates the frame power of sound data, for example. In the case of the speech recognition apparatus 1 using a navigation device installed on a vehicle, since the S/N ratio in a lower frequency band is low inside the vehicle, it may be possible to calculate the integral value of the power spectrum in a higher frequency band as the intensity of the sound data. Alternatively, it may be possible to use information other than the frame power as the intensity of the sound data.

In step S108, a determination is made as to whether or not impulse noise occurs by comparing a threshold value, which is set based on the background noise level, with the intensity such as the frame power of sound data calculated in step S107. The background noise level is an average level of the frame power in a voiceless segment in which impulse noise does not occur and voice is not contained. For example, in a series of processing, every time the sound data is distinguished as a voiceless segment in which impulse noise does not occur in a target frame, the background noise level is updated by using the level of the present frame power as the latest background noise level. Then, by adding a predetermined value to the background noise level, a threshold value is set. When the calculated intensity such as the frame power exceeds the threshold value, the time is recorded, and then, when the intensity becomes lower than the threshold value, the time is recorded again. Further, the maximum value (the largest value) of the intensity during a period from the time at which the intensity exceeded the threshold value to the time at which it became lower than the threshold value is recorded. The time difference between the time at which the intensity exceeded the threshold value and the time at which it became lower than the threshold value is calculated. When the calculated time difference is shorter than the predetermined time reference value and the maximum value of the intensity during this period is greater than a predetermined intensity reference value, a determination is made that impulse noise occurs. Even when the time difference is smaller than the time reference value, if the maximum value of the intensity during this period is not greater than the intensity reference value, the speech recognition apparatus 1 does not determine that impulse noise occurs. Also, even when the maximum value of the intensity is greater than the intensity reference value, if the time difference is greater than the time reference value, the speech recognition apparatus 1 does not determine that impulse noise occurs.

In step S108, when a determination is made that impulse noise does not occur (S108: NO), the speech recognition apparatus 1 refers to the acoustic models recorded in the acoustic model database 11b and the recognizable vocabulary and grammar recorded in the recognition dictionary 11c, based on the feature vectors that is the feature components extracted from the frames stored in the frame buffer 12b, and executes speech recognition processing (S109), under the control of the control means 10. In step S109, speech recognition processing is executed by reading the feature vectors sequentially from the feature vector related to the oldest frame recorded in the frame buffer 12b. Speech recognition processing is performed by calculating the similarity between the feature vectors and the acoustic models and referring to language information about the recognizable vocabulary. In this case, since the processing is performed for a frame distinguished as a voiceless segment in step S106, it may be possible to omit the speech recognition processing.

In step S108, when a determination is made that impulse noise occurs (S108: YES), the speech recognition apparatus 1 defines the time at which the intensity became lower than the threshold value as the end time of impulse noise and defines the time difference between the time at which the intensity exceeded the threshold value and the time at which it became lower than the threshold value as the duration time of impulse noise, and records the end time and duration time of impulse noise in a memory such as the recording means 11 and the storing means 12 (S110), under the control of the control means 10. By the recording operation in step S110, the information of the end time and duration time of all impulse noise which occur in past time is recorded.

Under the control of the control means 10, the speech recognition apparatus 1 determines whether or not there is periodicity in occurrence of impulse noise, based on the recorded end time of a plurality of impulse noises (S111). When a determination is made that there is periodicity (S111: YES), the speech recognition apparatus 1 derives the occurrence cycle of impulse noise (S112), and records the derived occurrence cycle in the memory such as the recording means 11 and storing means 12 (S113). When making a determination in step S111 as to whether or not there is periodicity, the speech recognition apparatus 1 determines the periodicity of occurrence of impulse noise based on the end time. When the differences between intervals of the occurrences are all within a predetermined threshold value such as within ±1 frame, the speech recognition apparatus 1 determines that there is periodicity and derives the average value of the occurrence intervals based on the end time as the occurrence cycle in step S112. When there is an occurrence interval equal to or greater than the predetermined threshold value, such as 500 ms, in step S111, the speech recognition apparatus 1 determines that there is no periodicity because the occurrence interval is too long as the sound of hazard flasher. On the other hand, when there is an occurrence interval smaller than the predetermined threshold value, such as 100 ms, the speech recognition apparatus 1 determines that there is no periodicity because the occurrence interval is too short as the sound of hazard flasher. It is preferable to set the threshold value for the occurrence interval of the sound of hazard flasher by previously measuring or checking the occurrence interval of the sound of hazard flasher in a vehicle in which the speech recognition apparatus is expected to be installed. Note that, in the processing performed in steps S109 to S112, the speech recognition apparatus 1 may define the time at which the intensity exceeds the threshold value as the start time of impulse noise, derive an occurrence cycle based on the start time, and record it.

Then, under the control of the control means 10, the speech recognition apparatus 1 calculates the average value of the recorded duration time of a plurality of impulse noises, and records the calculated average value as the duration time in the memory such as the recording means 11 and storing means 12 (S114). Based on the occurrence cycle and duration time recorded by the processing performed in steps S112 to S114, a determination is made that impulse noise occurs periodically, and the occurrence cycle and duration time of impulse noise are updated consecutively. Note that, after recording the occurrence cycle and duration time, when a determination is made that impulse noise does not occur at the segment predicted from the occurrence cycle and the duration time, a determination is made that the periodical occurrence of impulse noise is finished, and the recorded value of occurrence cycle and duration time is cleared. Furthermore in step S111, when a determination is made that there is no periodicity (S111: NO), the recorded value of occurrence cycle and duration time is cleared.

Under the control of the control means 10, the speech recognition apparatus 1 specifies frames in which impulse noise occurs (S115), and deletes the feature components of the specified frames from the frame buffer 12*b* (S116). Since it is considered that impulse noise continues to occur during a period from the time at which the intensity exceeds the threshold value to the time at which the intensity becomes lower than the threshold value, a plurality of frames are usually specified in step S115 and deleted in step S116. As the deletion method in step S116, although the feature components may be actually deleted, it may be possible to use a variety of methods as long as the feature components are not used in speech recognition processing performed in step S109. For example, flags may be set for the feature components of frames specified as having impulse noise so that the feature components of the frames with the flag are not used in the speech recognition processing in step S109. Alternatively, if the frame buffer 12*b* is a ring buffer, it may be possible to go back the pointer to the start point of the impulse noise and overwrite the newly calculated feature components in the impulse noise occurrence segment.

Then, under the control of the control means 10, the speech recognition apparatus 1 proceeds to step S109, refers to the acoustic models recorded in the acoustic model database 11*b* and the recognizable vocabulary and grammar recorded in the recognition dictionary 11*c*, based on the feature vectors as the feature components of the frames stored in the frame buffer 12*b*, and executes speech recognition processing (S109). In this case, since the feature components of the frames specified as having impulse noise were deleted from the frame buffer 12*b*, they are not used in the speech recognition processing. Moreover, since the processing is performed for a frame which was distinguished as a voiceless segment in step S106, it may be possible to omit the speech recognition processing.

In step S111, when a determination is made that there is no periodicity (S111: NO), the speech recognition apparatus 1 does not perform the processing of steps S112 to S114, proceeds to step S115, and executes the subsequent processing, under the control of the control means 10. In other words, even when a determination is made that there is no periodicity, the feature components of frames specified as having impulse noise are deleted. Therefore, when impulse noise occurs in a voiceless segment which is called "guard frame" and added before and after a voice segment to prevent cutting of the beginning and end portions of a word during the detection of a voice segment, it is possible to prevent insertion error of phoneme, syllable and word in the guard frames.

In step S106, when a determination is made that the sound data is a voice segment (S106: YES), the speech recognition apparatus 1 determines whether or not periodical impulse noise occurs (S117), under the control the control means 10. In step S117, a determination as to whether or not periodical impulse noise occurs is made by checking whether or not the values of occurrence cycle and duration time of impulse noise are recorded in the memory such as the recording means 11 and the storing means 12, for example. Specifically, when the values of occurrence cycle and duration time are recorded, the speech recognition apparatus 1 determines that periodical impulse noise occurs. It may also be possible to add a flag indicating that periodical impulse noise occurs.

In step S117, when a determination is made that periodical impulse noise occurs (S117: YES), the speech recognition apparatus 1 predicts the segment in which impulse noise occurs, based on the recorded occurrence cycle and duration time (S118). In step S118, the speech recognition apparatus 1 regards that impulse noise continues to occur periodically at the recorded occurrence cycle and for the duration time, and predicts that the next impulse noise starts at the time calculated by adding a natural number multiple of the occurrence cycle to the start time of the last impulse noise which occurs and that impulse noise occurs until the duration time elapses from the start time. Note that when only the end time of impulse noise is recorded, the time obtained by subtracting the duration time from the end time is regarded as the start time.

Under the control of the control means 10, the speech recognition apparatus 1 specifies frames corresponding to the predicted segment (S119), and deletes the feature components of the specified frames from the frame buffer 12*b* (S120). Since it is considered that impulse noise continues to occur in the duration time, the feature components of a plurality of frames are usually specified in step S119 and deleted in step S120.

Then, under the control of the control means 10, the speech recognition apparatus 1 proceeds to step S109, and executes speech recognition processing by referring to the acoustic models recorded in the acoustic model database 11b and the recognizable vocabulary and grammar recorded in the recognition dictionary 11c, based on the feature vectors which are the feature components of the frames stored in the frame buffer 12b (S109). In this case, since the feature components of the frames specified as having impulse noise were deleted from the frame buffer 12b, the speech recognition processing is performed based on the feature components of remaining frames excluding the feature components of frames corresponding to the predicted segment.

In step S117, when a determination is made that periodical impulse noise does not occur (S117: NO), the speech recognition apparatus 1 does not perform the processing of steps S118 to S120, proceeds to step S109, and executes speech recognition processing by referring to the acoustic models recorded in the acoustic model database 11b and the recognizable vocabulary and grammar recorded in the recognition dictionary 11c, based on the feature vectors which are the feature components extracted from the frames stored in the frame buffer 12b (S109).

Thus, in Embodiment 1 of the present invention, the occurrence cycle and duration time of impulse noise which occurs periodically are recorded in advance of a voice segment, the segment in which periodical impulse noise is supposed to occur and be superimposed on voice is predicted based on the recorded occurrence cycle and duration time, and speech recognition processing is executed based on the feature components of remaining frames excluding the feature components of frames corresponding to the predicated segment. Therefore, in Embodiment 1 of the present invention, since the feature components of "dirty" frames containing impulse noise will not be used for speech recognition, it is possible to control a decrease in the speech recognition accuracy caused by a decrease in the similarity in the speech recognition processing. Further, it is possible to reduce recognition errors caused by the "insertion error" of phoneme, syllable and word due to impulse noise. It is thus possible to execute speech recognition processing highly accurately even under an environment where impulse noise occurs.

Embodiment 2

In contrast to Embodiment 1 in which impulse noise is deleted on a frame-by-frame basis, Embodiment 2 is a mode in which impulse noise is deleted on the waveform of sampled sound data, frames are created based on the sound data from which impulse noise was deleted, and then speech recognition processing is executed. Since the structural example of a speech recognition apparatus according to Embodiment 2 is similar to that in Embodiment 1, the explanation thereof will be omitted by referring to Embodiment 1. Moreover, the component elements similar to Embodiment 1 will be explained by adding the same codes as in Embodiment 1.

Figure 4:
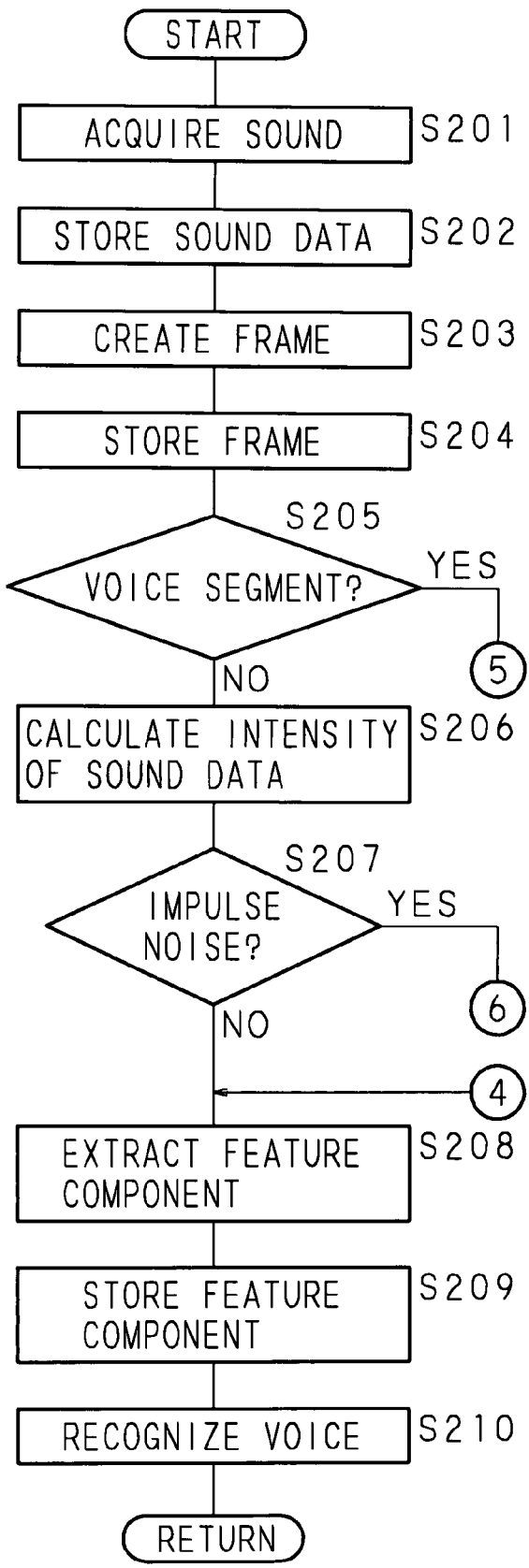
FIG. 4 is a flowchart showing one example of processing performed by a speech recognition apparatus according to Embodiment 2 of the present invention.
Figure 5:
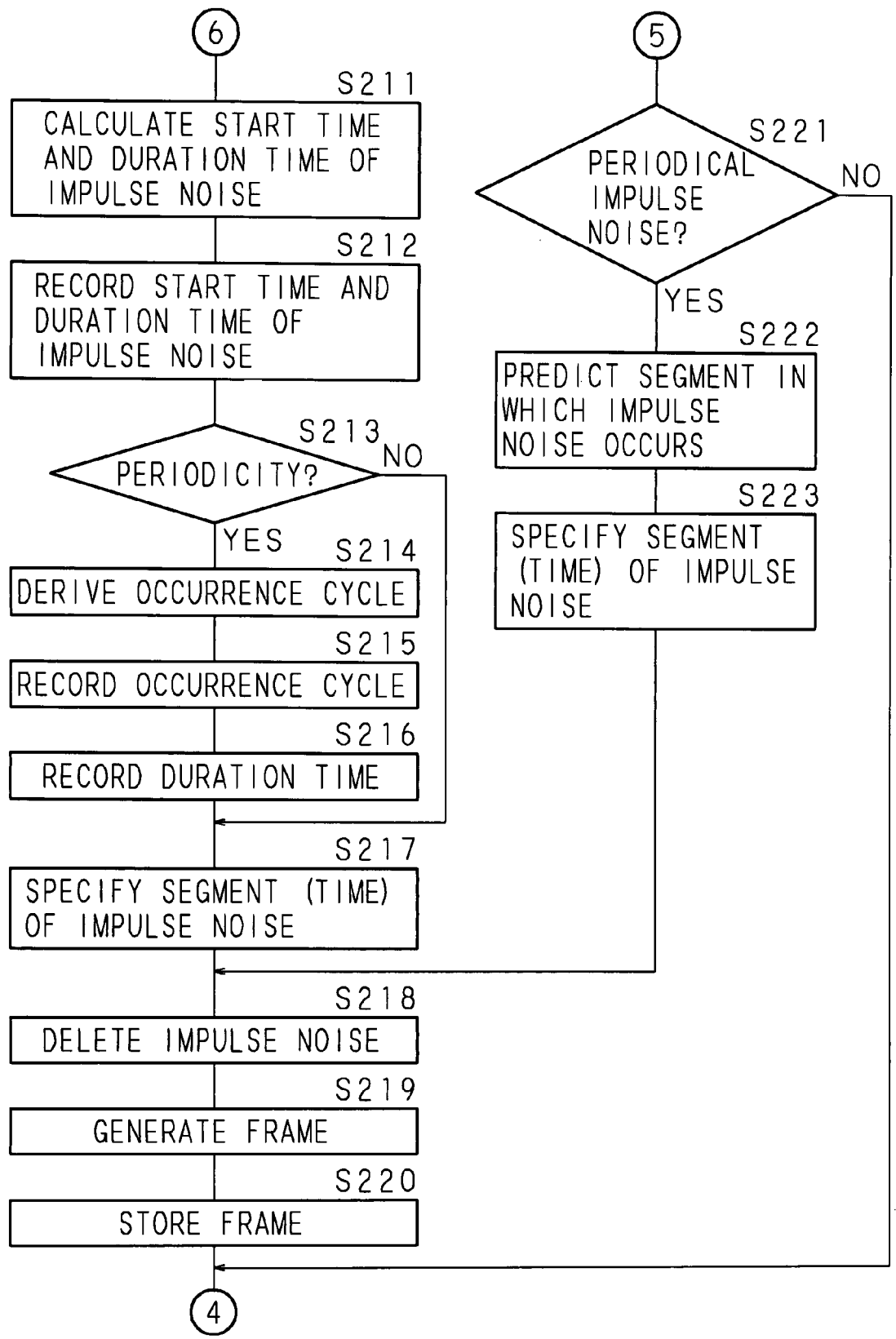
FIG. 5 is a flowchart showing one example of processing performed by the speech recognition apparatus according to Embodiment 2 of the present invention.

The following description will explain the processing performed by a speech recognition apparatus 1 according to Embodiment 2 of the present invention. FIGS. 4 and 5 are a flowchart showing one example of processing performed by the speech recognition apparatus 1 according to Embodiment 2. Under the control of the control means 10 that executes the computer program 11a, the speech recognition apparatus 1 acquires outside sound by the sound acquiring means 13 (S201), and digitizes the acquired sound, that is, an analog signal at a predetermined cycle (sampling rate) and stores the resulting digitized sound data in the sound data buffer 12a (S202). This embodiment allocates an area capable of recording sound data of a length calculated by adding a length equal to or longer than one frame to the maximum length of supposed impulse noise in the sound data buffer 12a.

Under the control of the control means 10, the speech recognition apparatus 1 creates frames whose length is predetermined, from the sound data stored in the sound data buffer 12a (S203), and stores the created frames in the frame buffer 12b (S204). In step S203, the sound data is divided into frames by a predetermined length of 20 ms to 30 ms, for example. The respective frames overlap each other by 10 ms to 15 ms. For each of the frames, the speech recognition apparatus 1 performs general frame processing including windowing using a Hamming window, a Hanning window etc. and filtering with a high pass filter. The following processing is performed on each of the frames thus created.

Under the control of the control means 10, the speech recognition apparatus 1 determines whether the sound data related to a frame is a voice segment containing voice or a voiceless segment containing no voice (S205).

In step S205, when the sound data is distinguished as a voiceless segment (S205: NO), the speech recognition apparatus 1 calculates the intensity of sound data to be used for detecting impulse noise (S206), and determines, based on the calculated intensity of the sound data, whether or not impulse noise occurs (S207), under the control of the control means 10.

In step S207, when a determination is made that impulse noise does not occur (S207: NO), the speech recognition apparatus 1 extracts a feature component, such as a feature vector, from the digital signal that is the frame stored in the frame buffer 12b (S208), and stores the extracted feature component such as a feature vector in the frame buffer 12b (S209), under the control of the control means 10.

Then, under the control of the control means 10, the speech recognition apparatus 1 executes the speech recognition processing by referring to the acoustic models recorded in the acoustic model database 11b and the recognizable vocabulary and grammar recorded in the recognition dictionary 11c, based on the feature vector that is the feature component extracted from the frame stored in the frame buffer 12b (S210). In step S210, the speech recognition processing is performed by reading the feature vector recorded in the frame buffer 12b. The speech recognition processing is performed by calculating the similarity between the feature vectors and the acoustic models and referring to language information about the recognizable vocabulary. In this case, since the processing is performed for a frame distinguished as a voiceless segment in step S205, it may be possible to omit the speech recognition processing.

In step S207, when a determination is made that impulse noise occurs (S207: YES), the speech recognition apparatus 1 calculates the start time and duration time of impulse noise (S211), under the control of the control means 10. In step S211, the start time of impulse noise indicates the time at which the intensity of sound data exceeded the threshold value, and the duration time indicates a time difference between the time at which the intensity exceeded the threshold value and the time at which it became lower than the threshold value. It may also be possible to record the time at which the intensity became lower than the threshold value as the end time of impulse noise. In the calculation performed in step S211, the accurate start time and duration time of impulse noise are calculated by comparing the intensity and the threshold value at the waveform level of sound data contained in the frames, instead of comparing the intensity and the threshold value at the frame level. For example, the contour of values of the intensity obtained by squaring amplitude of each of the samples for several to several tens samples is defined as the waveform of sound data, and the time at which the waveform based on the contour exceeded the threshold value is detected as the start time. The time at which the intensity became lower than the threshold value may also be accurately detected by the same method.

Then, under the control of the control means 10, the speech recognition apparatus 1 records the start time and duration time of impulse noise calculated in step S211 in a memory such as the recording means 11 and storing means 12 (S212).

Under the control of the control means 10, the speech recognition apparatus 1 determines whether or not there is periodicity in impulse noise, based on the recorded start time of a plurality of impulse noises (S213). When a determination is made that there is periodicity (S213: YES), the speech recognition apparatus 1 derives the occurrence cycle of impulse noise (S214), and records the derived occurrence cycle in the memory such as the recording means 11 and storing means 12 (S215). Further, under the control of the control means 10, the speech recognition apparatus 1 calculates the average value of the recorded duration time of a plurality of impulse noises, and records the calculated average value as the duration time in the memory such as the recording means 11 and storing means 12 (S216).

Based on information such as the start time and duration time (or the start time and end time) of impulse noise calculated in step S211 and recorded in step S212, the speech recognition apparatus 1 specifies a segment (time) of impulse noise as a segment to be deleted from the sound data that is digital data obtained by sampling the acquired sound stored in the sound data buffer 12*a* (S217), under the control of the control means 10. In step S217, the process of moving a pointer on the sound data buffer 12*a* is performed based, for example, on the accurate start time and duration time of impulse noise calculated in step S211.

Then, under the control of the control means 10, the speech recognition apparatus 1 performs impulse noise part deletion processing for deleting a specified segment, that is, a part of the sound data corresponding to the segment in which impulse noise occurs, and generating sound data by connecting the sound data before and after the deleted part (S218). The sound data from which the noise part was deleted is stored in the sound data buffer 12*a*. At this time, it may be possible to overwrite the sound data from which the noise part was deleted to replace the sound data from which the noise part is to be deleted.

Under the control of the control means 10, the speech recognition apparatus 1 recreates frames whose length is predetermined, from the sound data from which the part corresponding to impulse noise was deleted (S219), and stores the created frames in the frame buffer 12*b* (S220). In step S219, the sound data from which the noise part was deleted is divided into frames by a predetermined length of, for example, 20 ms to 30 ms. The respective frames overlap each other by 10 ms to 15 ms. For each of the frames, the speech recognition apparatus 1 performs frame processing which is general to the field of speech recognition, including windowing using a Hamming window, a Hanning window etc., and filtering with a high pass filter. The following processing is performed on each of the frames thus created. In step S220, when storing the frames created in step S219, it may be possible to overwrite the created frames to replace the frames stored in step S204, that is, the frames from which the noise part was not deleted.

Then, under the control of the control means 10, the speech recognition apparatus 1 proceeds to step S208, and executes various kinds of processing ranging from the extraction of feature components to speech recognition (S208 to S210). In this case, since the segment specified as having impulse noise was deleted, this segment is not used in the speech recognition processing. Moreover, since the processing is performed for a frame distinguished as a voiceless segment in step S205, it may be possible to omit the speech recognition processing.

In step S213, when a determination is made that there is no periodicity (S213: NO), the speech recognition apparatus 1 does not perform the processing of steps S214 to S216, and proceeds to step S217 and executes the subsequent processing, under the control of the control means 10. In other words, even when a determination is made that there is no periodicity, frames specified as having impulse noise are deleted. Thus, when impulse noise occurs in a voiceless segment called "guard frame" which is added before and after a voice segment to prevent cutting of the beginning and end portions of a word during the detection of a voice segment, it is possible to prevent insertion error of phoneme, syllable and word in the guard frames.

In step S205, when a determination is made that the sound data is a voice segment (S205: YES), the speech recognition apparatus 1 determines whether or not periodical impulse noise occurs (S221), under the control the control means 10.

In step S221, when a determination is made that periodical impulse noise occurs (S221: YES), the speech recognition apparatus 1 predicts the segment in which impulse noise occurs, based on the recorded occurrence cycle and duration time (S222). In step S222, the speech recognition apparatus 1 regards that the impulse noise continues to occur periodically at the recorded occurrence cycle and for the duration time, and predicts that the next impulse noise starts at the time calculated by adding a natural number multiple of the occurrence cycle to the start time of the last impulse noise which occurs and that impulse noise occurs until the duration time elapses from the start time. Note that when only the end time of impulse noise is recorded, the time obtained by subtracting the duration time from the end time is regarded as the start time.

Under the control of the control means 10, the speech recognition apparatus 1 specifies a segment (time) of impulse noise based on the segment predicted from the sound data that is digital data obtained by sampling the acquired sound stored in the sound data buffer 12*a* (S223).

Then, under the control of the control means 10, the speech recognition apparatus 1 proceeds to step S218, and executes impulse noise part deletion processing for deleting the specified segment, that is, a part of the sound data corresponding to the segment in which impulse noise occurs, from the sound data, and generating sound data by connecting the sound data before and after the deleted part (S218), recreates frames whose length is predetermined, from the sound data from which the part corresponding to impulse noise was deleted (S219), and stores the created frames in the frame buffer 12*b* (S220).

Under the control of the control means 10, the speech recognition apparatus 1 proceeds to step S208, and executes various kinds of processing from the extraction of feature components to speech recognition (S208 to S210). In this case, since a segment specified as having impulse noise was deleted, this segment is not used in the speech recognition processing.

In step S221, when a determination is made that periodical impulse noise does not occur (S221: NO), the speech recognition apparatus 1 does not perform the processing of steps S222 to S223 and steps S218 to S220, and proceeds to step S208 and executes various kinds of processing from the extraction of feature components to speech recognition (S208 to S210), under the control of the control means 10.

Thus, in Embodiment 2 of the present invention, the occurrence cycle and duration time of impulse noise which occurs periodically are recorded beforehand, the segment in which periodical impulse noise is supposed to occur and be superimposed on voice is predicted based on the recorded occurrence cycle and duration time, frames are created based on the sound data from which parts corresponding to the predicted segment were deleted, and speech recognition processing is executed based on feature components extracted from the created frames. Therefore, in Embodiment 2 of the present invention, since the sound data in a "dirty" segment containing impulse noise is not used in speech recognition, it is possible to control a decrease in the speech recognition accuracy caused by a decrease in the similarity in the speech recognition processing. In addition, it is also possible to reduce recognition errors caused by the "insertion error" of phoneme, syllable and word due to impulse noise. It is thus possible to execute speech recognition processing highly accurately even under an environment where impulse noise occurs. Since the deletion of sound data is executed for the domain of sound data instead of the domain of frame, it is possible to avoid the deletion of "innocent" sound data in which impulse noise does not occur.

Embodiment 3

In contrast to Embodiment 1, Embodiment 3 is a mode in which a determination is made as to whether or not periodical impulse noise is present, based on a signal received from an external device such as an electric control unit. Since the structural example of a speech recognition apparatus according to Embodiment 3 is similar to that in Embodiment 1, the explanation thereof will be omitted by referring to Embodiment 1. Moreover, in the following explanation, the component elements similar to Embodiment 1 will be explained by adding the same codes as in Embodiment 1.

Figure 6:
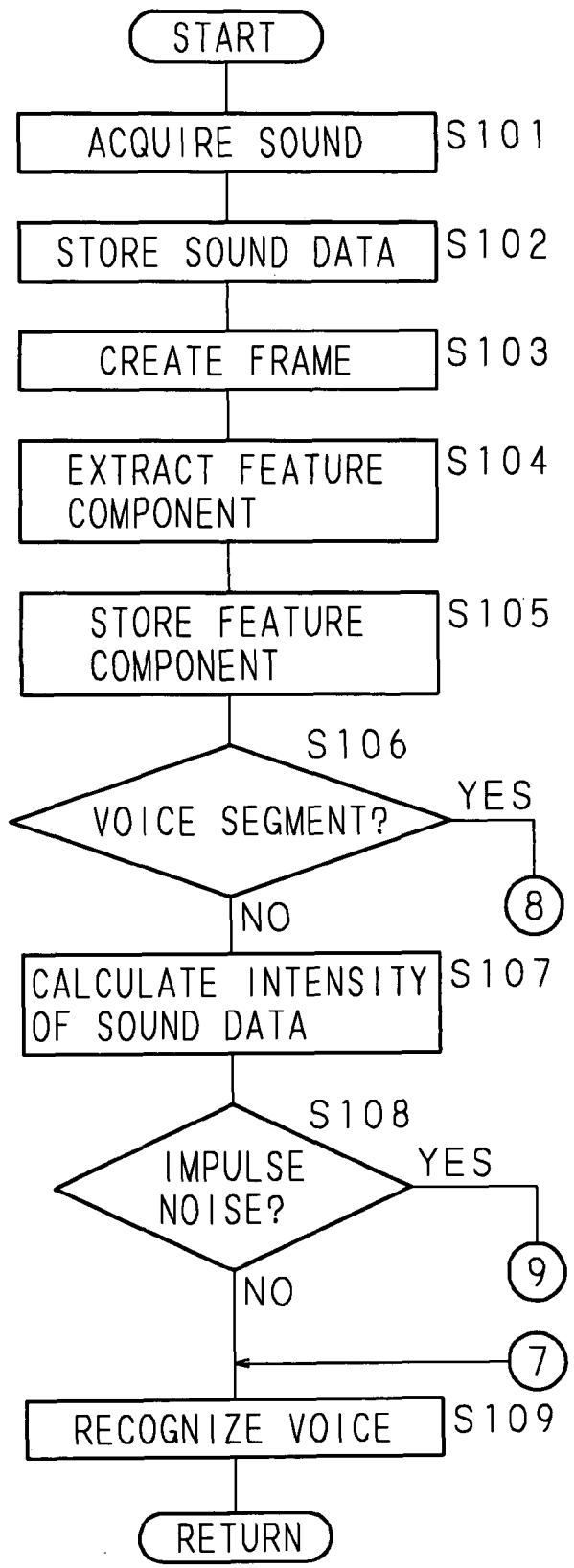
FIG. 6 is a flowchart showing one example of processing performed by a speech recognition apparatus according to Embodiment 3 of the present invention.
Figure 7:
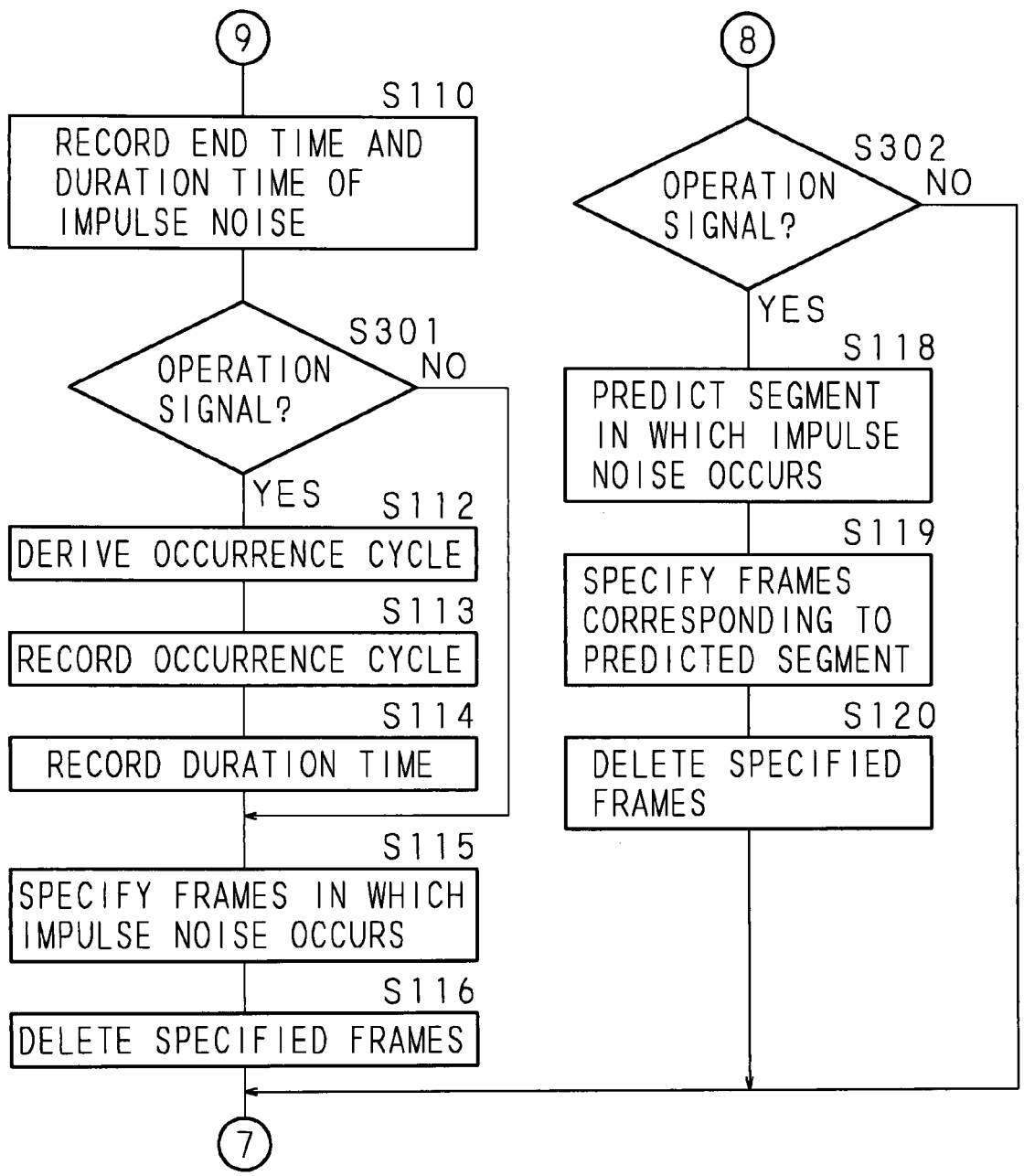
FIG. 7 is a flowchart showing one example of processing performed by the speech recognition apparatus according to Embodiment 3 of the present invention.

Next, the following description will explain the processing performed by a speech recognition apparatus 1 according to Embodiment 3 of the present invention. FIGS. 6 and 7 are a flowchart showing one example of processing performed by the speech recognition apparatus 1 according to Embodiment 3. In FIGS. 6 and 7, for the processing similar to Embodiment 1, the detailed explanation thereof will be omitted by adding the same codes as in Embodiment 1 and referring to Embodiment 1. The processing from steps S101 to S109 is the same as in Embodiment 1.

In step S108, when a determination is made that impulse noise occurs (S108: YES), the speech recognition apparatus 1 records the end time and duration time of the impulse noise in a memory such as the recording means 11 and the storing means 12 (S110), under the control of the control means 10.

Then, under the control of the control means 10, the speech recognition apparatus 1 determines whether or not the signal receiving means 17 receives an operation signal indicating that an operation related to the generation of impulse noise is in progress from the external device 2 (S301). The external device 2 is an electric control unit for controlling mechanisms, such as a hazard flasher and direction indicator, which are installed on a vehicle and generate periodical impulse noise such as the relay sound, or a signal generating device connected to the electric control unit, and outputs the operation signal to the speech recognition apparatus 1 when the mechanisms, such as a hazard flasher and direction indicator operate. When the speech recognition apparatus 1 receives the operation signal, it determines that the impulse noise which occurs is impulse noise having periodicity.

In step S301 when a determination is made that the operation signal is received (S301: YES), the speech recognition apparatus 1 determines that the impulse noise which occurs has periodicity and derives the occurrence cycle of impulse noise (S112), records the derived occurrence cycle in a memory such as the recording means 11 and the storing means 12 (S113), and further calculates the average value of the recorded duration time of a plurality of impulse noises and records the calculated average value as the duration time in the memory such as the recording means 11 and the storing means 12 (S114), under the control of the control means 10. Note that the occurrence cycle and duration time of impulse noise may be measured and recorded in the memory beforehand. In this case, it may be possible to omit the processing of steps S112 to S114.

Then, under the control of the control means 10, the speech recognition apparatus 1 specifies frames in which impulse noise occurs (S115), deletes the feature components of the specified frames from the frame buffer 12*b* (S116), and proceeds to step S109 and executes the speech recognition processing (S109).

In step S301, when a determination is made that the operation signal is not received (S301: NO), the speech recognition apparatus 1 determines that the impulse noise which occurs does not have periodicity, and proceeds to step S115 and executes the subsequent processing, without performing the processing of steps S112 to S114.

In step S106, when the sound data is distinguished as a voice segment (S106: YES), the speech recognition apparatus 1 determines whether or not an operation signal indicating that an operation related to the generation of impulse noise is in progress is received from the external device 2 (S302), under the control of the control means 10. In step S301, when a determination is made that the operation signal is received, it is possible to determine that periodical impulse noise occurs.

In step S302, when a determination is made that the operation signal is received (S302: YES), the speech recognition apparatus 1 predicts the segment in which impulse noise occurs, based on the recorded occurrence cycle and duration time (S118), specifies frames corresponding to the predicted segment (S119), deletes the feature components of the specified frames from the frame buffer 12*b* (S120), and proceeds to step S109 and executes the speech recognition processing (S109), under the control of the control means 10.

In step S302, when a determination is made that the operation signal is not received (S302: NO), the speech recognition apparatus 1 proceeds to step S109 and executes the speech recognition processing (S109), without performing the processing of steps S118 to S120, under the control of the control means 10.

Thus, in Embodiment 3 of the present invention, a determination as to whether or not impulse noise occurs is made based on an operation signal from the external device 2. Therefore, even when impulse noise is stopped while a person is giving a speech, the feature component of the frame will not be deleted. Note that it may also be possible to perform the process of determining the presence or absence of occurrence of impulse noise, based on an operation signal, in Embodiment 2.

Embodiments 1 through 3 described above merely illustrate examples of a part of countless modes of the present invention, and it may be possible to suitably set the structures of various kinds of hardware, software, etc., and it may be possible to combine various kinds of processing in addition to the above-exemplified basic processing. For example, in Embodiments 1 through 3 described above, although a mode corresponding to one cycle of impulse noise is illustrated, the present invention is not limited to this, and it may be possible to develop the present invention in a mode corresponding to a plurality of cycles of impulse noise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A speech recognition method, which creates plural frames whose length is predetermined, from sound data obtained by sampling sound and executes speech recognition processing based on feature components extracted from the respective frames, comprising the steps of:
    storing the plural frames in a frame buffer;
    determining whether an impulse noise occurs or not in a frame, based on a comparison with a power of the frame and an average power of frames in which an impulse noise has not occurred and voice has not been contained;
    recording an occurrence cycle and a duration time of the impulse noise that occurs periodically;
    predicting, based on the occurrence cycle and the duration time, a segment in which it is determined that the impulse noise occurs; and
    executing speech recognition processing based on feature components of remaining frames stored in the frame buffer in which a frame corresponding to the segment that was predicted is excluded from the plural frames, wherein
    the predicted segment is deleted from the frame buffer,
    each of the plural frames is determined whether a voice segment containing voice or a voiceless segment containing no voice, and the speech recognition processing is not performed on the predicted segment of the voice segment.

2. A speech recognition method, which creates plural frames whose length is predetermined, from sound data obtained by sampling sound and executes speech recognition processing based on feature components extracted from the respective frames, comprising the steps of:
    storing the plural frames in a frame buffer;
    determining whether an impulse noise occurs or not in a frame, based on a comparison with a power of the frame and an average power of frames in which an impulse noise has not occurred and voice has not been contained;
    recording an occurrence cycle and a duration time of the impulse noise that occurs periodically;
    predicting, based on the occurrence cycle and the duration time, a segment in which it is determined that the impulse noise occurs;
    creating frames whose length is predetermined, in which a part corresponding to the segment that was predicted is excluded from the sound data; and
    executing speech recognition processing based on feature components extracted from the respective frames stored in the frame buffer, wherein
    the predicted segment is deleted from the frame buffer,
    each of the plural frames is determined whether a voice segment containing voice or a voiceless segment containing no voice, and the speech recognition processing is not performed on the predicted segment of the voice segment.

3. A speech recognition apparatus, which comprises a buffer for storing feature components extracted from frames whose length is predetermined, created from sound data obtained by sampling sound and executes speech recognition processing based on the feature components of the respective frames stored in the buffer, comprising:
    a determining section for determining whether an impulse noise occurs or not in a frame, based on a comparison with a power of the frame and an average power of frames in which an impulse noise has not occurred and voice has not been contained;
    a recording section for recording an occurrence cycle and a duration time of the impulse noise that occurs periodically; and
    a controller capable of:
        predicting, based on the occurrence cycle and the duration time recorded in the recording section, a segment in which it is determined by the determining section that the impulse noise occurs; and
        deleting a frame corresponding to the segment that was predicted from the buffer, wherein
    each of the plural frames is determined whether a voice segment containing voice or a voiceless segment containing no voice, and the speech recognition processing is not performed on the predicted segment of the voice segment.

4. The speech recognition apparatus according to claim 3, wherein said controller is further capable of:
    distinguishing between a voice segment containing voice and a voiceless segment containing no voice in the sound data;
    determining, based on an intensity of the sound data corresponding to a segment distinguished as a voiceless segment, whether or not impulse noise occurs; and
    if a determination is made that impulse noise occurs, calculating an occurrence cycle and a duration time of the impulse noise which occurs, based on the intensity of the sound data in a voiceless segment, and
    said recording section records the occurrence cycle and the duration time that were calculated.

5. The speech recognition apparatus according to claim 4, wherein said controller is further capable of predicting a segment in which impulse noise occurs, within a segment distinguished as a voice segment.

6. The speech recognition apparatus according to claim 4, wherein said controller is further capable of determining whether or not impulse noise occurs based on a maximum value of the intensity of the sound data, and a period from a time at which the intensity exceeded a preset threshold value to a time at which the intensity became lower than the threshold value.

7. The speech recognition apparatus according to claim 3, wherein said controller is further capable of:
    calculating the duration time based on a period from a time at which the intensity of the sound data exceeded a preset threshold value to a time at which the intensity became lower than the threshold value; and
    calculating the occurrence cycle based on an interval of the time at which the intensity exceeded the threshold value or the time at which the intensity became lower than the threshold value.

8. The speech recognition apparatus according to claim 3, further comprising a receiving section for receiving an operation signal indicating that an operation related to the generation of impulse noise is in progress from an external device related to the generation of impulse noise, wherein said controller is further capable of predicting, based on the operation signal, a segment in which impulse noise occurs.

9. A speech recognition apparatus, which comprises a buffer for storing frames whose length is predetermined, created from sound data obtained by sampling sound and executes speech recognition processing based on feature components extracted from the respective frames stored in the buffer, comprising:
   a determining section for determining whether an impulse noise occurs or not in a frame, based on a comparison with a power of the frame and an average power of frames in which an impulse noise has not occurred and voice has not been contained;
   a recording section for recording an occurrence cycle and a duration time of the impulse noise that occurs periodically; and
   a controller capable of:
      predicting, based on the occurrence cycle and the duration time recorded in the recording section, a segment in which it is determined by the determining section that the impulse noise occurs;
      deleting a part corresponding to the predicted segment from the sound data;
      creating frames whose length is predetermined, from the sound data from which the part corresponding to the segment that was predicted was deleted; and
      storing the frames that were created in the buffer, wherein
   each of the plural frames is determined whether a voice segment containing voice or a voiceless segment containing no voice, and the speech recognition processing is not performed on the predicted segment of the voice segment.

10. The speech recognition apparatus according to claim 9, wherein said controller is further capable of:
    distinguishing between a voice segment containing voice and a voiceless segment containing no voice in the sound data;
    determining, based on an intensity of the sound data corresponding to a segment distinguished as a voiceless segment, whether or not impulse noise occurs; and
    if a determination is made that impulse noise occurs, calculating an occurrence cycle and a duration time of the impulse noise which occurs, based on the intensity of the sound data in a voiceless segment, and
    said recording section records the occurrence cycle and the duration time that were calculated.

11. The speech recognition apparatus according to claim 10, wherein said controller is further capable of predicting a segment in which impulse noise occurs, within a segment distinguished as a voice segment.

12. The speech recognition apparatus according to claim 10, wherein said controller is further capable of determining whether or not impulse noise occurs based on a maximum value of the intensity of the sound data, and a period from a time at which the intensity exceeded a preset threshold value to a time at which the intensity became lower than the threshold value.

13. The speech recognition apparatus according to claim 9, wherein said controller is further capable of:
    calculating the duration time based on a period from a time at which the intensity of the sound data exceeded a preset threshold value to a time at which the intensity became lower than the threshold value; and
    calculating the occurrence cycle based on an interval of the time at which the intensity exceeded the threshold value or the time at which the intensity became lower than the threshold value.

14. The speech recognition apparatus according to claim 9, further comprising a receiving section for receiving an operation signal indicating that an operation related to the generation of impulse noise is in progress from an external device related to the generation of impulse noise, wherein
    said controller is further capable of predicting, based on the operation signal, a segment in which impulse noise occurs.

15. A speech recognition apparatus, which comprises a buffer for storing feature components extracted from frames whose length is predetermined, created from sound data obtained by sampling sound and executes speech recognition processing based on the feature components of the respective frames stored in the buffer, comprising:
    determining means for determining whether an impulse noise occurs or not in a frame, based on a comparison with a power of the frame and an average power of frames in which an impulse noise has not occurred and voice has not been contained;
    recording means for recording an occurrence cycle and a duration time of the impulse noise that occurs periodically;
    predicting means for predicting, based on the occurrence cycle and the duration time recorded in the recording means, a segment in which it is determined by the determining means that the impulse noise occurs; and
    deleting means for deleting a frame corresponding to the segment that was predicted from the buffer, wherein
    each of the plural frames is determined whether a voice segment containing voice or a voiceless segment containing no voice, and the speech recognition processing is not performed on the predicted segment of the voice segment.

16. The speech recognition apparatus according to claim 15, further comprising:
    voice segment distinguishing means for distinguishing between a voice segment containing voice and a voiceless segment containing no voice in the sound data;
    noise determining means for determining, based on an intensity of the sound data corresponding to a segment distinguished as a voiceless segment by said voice segment distinguishing means, whether or not impulse noise occurs; and
    noise calculating means for calculating, if a determination is made that impulse noise occurs, an occurrence cycle and a duration time of the impulse noise which occurs, based on the intensity of the sound data in a voiceless segment, wherein
    said recording means records the occurrence cycle and the duration time that were calculated.

17. The speech recognition apparatus according to claim 16, wherein said predicting means predicts a segment in which impulse noise occurs, within a segment distinguished as a voice segment by said voice segment distinguishing means.

18. The speech recognition apparatus according to claim 16, wherein said noise determining means determines whether or not impulse noise occurs based on a maximum value of the intensity of the sound data, and a period from a time at which the intensity exceeded a preset threshold value to a time at which the intensity became lower than the threshold value.

19. The speech recognition apparatus according to claim 15, wherein said noise calculating means calculates the duration time based on a period from a time at which an intensity of the sound data exceeded a preset threshold value to a time at which the intensity became lower than the threshold value, and calculates the occurrence cycle based on an interval of the time at which the intensity exceeded the threshold value or the time at which the intensity became lower than the threshold value.

20. The speech recognition apparatus according to claim 15, further comprising means for receiving an operation signal indicating that an operation related to the generation of impulse noise is in progress from an external device related to the generation of impulse noise, wherein
    said predicting means predicts, based on the operation signal, a segment in which impulse noise occurs.

21. A speech recognition apparatus, which comprises a buffer for storing frames whose length is predetermined, created from sound data obtained by sampling sound and executes speech recognition processing based on feature components extracted from the respective frames stored in the buffer, comprising:
    determining means for determining whether an impulse noise occurs or not in a frame, based on a comparison with a power of the frame and an average power of frames in which an impulse noise has not occurred and voice has not been contained;
    recording means for recording an occurrence cycle and a duration time of the impulse noise that occurs periodically;
    predicting means for predicting, based on the occurrence cycle and the duration time recorded in the recording means, a segment in which it is determined by the determining means that the impulse noise occurs;
    means for deleting a part corresponding to the segment that was predicted from the sound data;
    means for creating frames whose length is predetermined, from the sound data from which the part corresponding to the segment that was predicted was deleted; and
    means for storing the frames that were created in the buffer, wherein
    each of the plural frames is determined whether a voice segment containing voice or a voiceless segment containing no voice, and the speech recognition processing is not performed on the predicted segment of the voice segment.

22. The speech recognition apparatus according to claim 21, further comprising:
    voice segment distinguishing means for distinguishing between a voice segment containing voice and a voiceless segment containing no voice in the sound data;
    noise determining means for determining, based on an intensity of the sound data corresponding to a segment distinguished as a voiceless segment by said voice segment distinguishing means, whether or not impulse noise occurs; and
    noise calculating means for calculating, if a determination is made that impulse noise occurs, an occurrence cycle and a duration time of the impulse noise which occurs, based on the intensity of the sound data in a voiceless segment, wherein
    said recording means records the occurrence cycle and the duration time that were calculated.

23. The speech recognition apparatus according to claim 22, wherein said predicting means predicts a segment in which impulse noise occurs, within a segment distinguished as a voice segment by said voice segment distinguishing means.

24. The speech recognition apparatus according to claim 22, wherein said noise determining means determines whether or not impulse noise occurs based on a maximum value of the intensity of the sound data, and a period from a time at which the intensity exceeded a preset threshold value to a time at which the intensity became lower than the threshold value.

25. The speech recognition apparatus according to claim 21, wherein said noise calculating means calculates the duration time based on a period from a time at which the intensity of the sound data exceeded a preset threshold value to a time at which the intensity became lower than the threshold value, and calculates the occurrence cycle based on an interval of the time at which the intensity exceeded the threshold value or the time at which the intensity became lower than the threshold value.

26. The speech recognition apparatus according to claim 21, further comprising means for receiving an operation signal indicating that an operation related to the generation of impulse noise is in progress from an external device related to the generation of impulse noise, wherein
    said predicting means predicts, based on the operation signal, a segment in which impulse noise occurs.

27. A non-transitory recording medium storing a computer program for causing a computer, which comprises a buffer storing feature components extracted from frames whose length is predetermined, created from sound data obtained by sampling sound, to execute speech recognition processing based on the feature components of the respective frames stored in the buffer, said computer program comprising:
    a step of causing the computer to determine whether an impulse noise occurs or not in a frame, based on a comparison with a power of the frame and an average power of frames in which an impulse noise has not occurred and voice has not been contained;
    a step of causing the computer to record an occurrence cycle and a duration time of the impulse noise that occurs periodically;
    a step of causing the computer to predict, based on the occurrence cycle and the duration time, a segment in which it is determined that the impulse noise occurs; and
    a step of causing the computer to delete a frame corresponding to the segment that was predicted from the buffer, wherein each of the plural frames is determined whether a voice segment containing voice or a voiceless segment containing no voice, and the speech recognition processing is not performed on the predicted segment of the voice segment.

28. A non-transitory recording medium storing a computer program for causing a computer, which comprises a buffer storing frames whose length is predetermined, created from sound data obtained by sampling sound, to execute speech recognition processing based on feature components extracted from the respective frames stored in the buffer, said computer program comprising:
    a step of causing the computer to determine whether an impulse noise occurs or not in a frame, based on a comparison with a power of the frame and an average power of frames in which an impulse noise has not occurred and voice has not been contained;
    a step of causing the computer to record an occurrence cycle and a duration time of the impulse noise that occurs periodically;

a step of causing the computer to predict, based on the occurrence cycle and the duration time, a segment in which it is determined that the impulse noise occurs;

a step of causing the computer to delete part corresponding to the segment that was predicted from the sound data; and a step of causing the computer to create frames whose length is predetermined, from the sound data from which the part corresponding to the predicted segment was deleted, wherein each of the plural frames is determined whether a voice segment containing voice or a voiceless segment containing no voice, and the speech recognition processing is not performed on the predicted segment of the voice segment.

* * * * *